(12) United States Patent
Kelly et al.

(10) Patent No.: US 11,553,216 B2
(45) Date of Patent: *Jan. 10, 2023

(54) SYSTEMS AND METHODS OF FACILITATING LIVE STREAMING OF CONTENT ON MULTIPLE SOCIAL MEDIA PLATFORMS

(71) Applicant: Halo Innovative Solutions LLC, Stone Mountain, GA (US)

(72) Inventors: Casey Teddell Kelly, Stone Mountain, GA (US); Kirk Brown, Stone Mountain, GA (US)

(73) Assignee: HALO INNOVATIVE SOLUTIONS LLC, Stone Mountain, GA (US)

(*) Notice: Subject to any disclaimer, the term of this patent is extended or adjusted under 35 U.S.C. 154(b) by 263 days.

This patent is subject to a terminal disclaimer.

(21) Appl. No.: 16/908,524

(22) Filed: Jun. 22, 2020

(65) Prior Publication Data

US 2020/0322648 A1  Oct. 8, 2020

Related U.S. Application Data

(63) Continuation-in-part of application No. 16/232,818, filed on Dec. 26, 2018, now Pat. No. 10,693,830.
(Continued)

(51) Int. Cl.
*H04N 21/2187* (2011.01)
*H04N 21/4788* (2011.01)
(Continued)

(52) U.S. Cl.
CPC ....... *H04N 21/2187* (2013.01); *H04N 21/235* (2013.01); *H04N 21/25816* (2013.01);
(Continued)

(58) Field of Classification Search
None
See application file for complete search history.

(56) References Cited

U.S. PATENT DOCUMENTS

| | | | |
|---|---|---|---|
| 7,724,284 B2 | 5/2010 | Mentzer | |
| 8,451,994 B2 | 5/2013 | Abuan et al. | |
| (Continued) | | | |

FOREIGN PATENT DOCUMENTS

| | | |
|---|---|---|
| JP | 5200446 B2 | 4/2008 |
| KR | 20020049391 A | 6/2002 |

*Primary Examiner* — Angela Nguyen

(57) ABSTRACT

Disclosed herein is a method of facilitating live streaming of content on multiple social media platforms. The method comprises receiving, using a communication device, a plurality of digital content from a source user device. Further, the method comprises receiving, using the communication device, a plurality of target identifiers from the source user device. Further, the method comprises identifying, using a processing device, a plurality of social media servers associated with the plurality of target identifiers. Further, the method comprises processing, using the processing device, the plurality of digital content based on a plurality of platform characteristics corresponding to the plurality of social media servers. Further, the method comprises generating, using the processing device, a plurality of transformed digital content based on the processing. Further, the method comprises transmitting, using the communication device, the plurality of transformed digital content to the plurality of social media servers.

35 Claims, 11 Drawing Sheets

Related U.S. Application Data

(60) Provisional application No. 62/577,698, filed on Oct. 26, 2017.

(51) Int. Cl.
*H04N 21/4223* (2011.01)
*H04N 21/45* (2011.01)
*H04N 21/258* (2011.01)
*H04N 21/442* (2011.01)
*H04N 21/4627* (2011.01)
*H04N 21/235* (2011.01)

(52) U.S. Cl.
CPC ... *H04N 21/4223* (2013.01); *H04N 21/44218* (2013.01); *H04N 21/4532* (2013.01); *H04N 21/4627* (2013.01); *H04N 21/4788* (2013.01)

(56) References Cited

U.S. PATENT DOCUMENTS

| | | |
|---|---|---|
| 10,179,543 B2 | 1/2019 | Rathi et al. |
| 2006/0139463 A1 | 6/2006 | Heinonen |
| 2017/0142035 A1* | 5/2017 | Bradley .................. H04L 67/42 |

* cited by examiner ly, the present disclosure relates to the field of data# SYSTEMS AND METHODS OF FACILITATING LIVE STREAMING OF CONTENT ON MULTIPLE SOCIAL MEDIA PLATFORMS The current application is a continuation-in-part (CIP) application of the U.S. non-provisional application Ser. No. 16/232,818 filed on Dec. 26, 2018.

TECHNICAL FIELD

Generally, the present disclosure relates to the field of data processing. More specifically, the present disclosure relates to systems and methods of facilitating live streaming of content on multiple social media platforms.

BACKGROUND

Existing techniques for posting (and/or live streaming) content (such as pictures or videos) on social media platforms are deficient with regard to several aspects. For instance, current technologies do not allow the user to post (such as provide live streaming of videos) on more than one platform at the same time. Furthermore, current technologies do not allow the user to select individuals (such as followers on Facebook™, Instagram™, or Twitter™, etc.) with whom the user may want to share the live stream video irrespective of the social media platform on which the individual may be present. Furthermore, the current technologies do not allow posting (and/or live streaming) content from multiple cameras simultaneously. Furthermore, the current technologies do not allow the user to mirror the content to the user's followers.

Therefore, there is a need for improved systems and methods of facilitating live streaming of content on multiple social media platform that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating live streaming of content on multiple social media platforms. The method may include receiving, using a communication device, a plurality of digital content from a source user device. Further, the source user device may include a plurality of content capturing devices configured for capturing the plurality of digital content. Further, the plurality of content capturing devices may be configured for simultaneously capturing the plurality of digital content from a plurality of content capturing directions. Further, the method may include receiving, using the communication device, a plurality of target identifiers from the source user device. Further, the plurality of target identifiers may correspond to a plurality of target user devices. Further, the method may include identifying, using a processing device, a plurality of social media servers associated with the plurality of target identifiers. Further, the method may include processing, using the processing device, the plurality of digital content based on a plurality of platform characteristics corresponding to the plurality of social media servers. Further, the method may include generating, using the processing device, a plurality of transformed digital content based on the processing. Further, the method may include transmitting, using the communication device, the plurality of transformed digital content to the plurality of social media servers.

According to some embodiments, a system of facilitating live streaming of content on multiple social media platforms is disclosed. The system may include a communication device configured for receiving a plurality of digital content from a source user device. Further, the source user device may include a plurality of content capturing devices configured for capturing the plurality of digital content. Further, the plurality of content capturing devices may be configured for simultaneously capturing the plurality of digital content from a plurality of content capturing directions. Further, the communication device may be configured for receiving a plurality of target identifiers from the source user device. Further, the plurality of target identifiers may correspond to a plurality of target user devices. Further, the communication device may be configured for transmitting a plurality of transformed digital content to a plurality of social media servers. Further, the system may include a processing device is configured for identifying the plurality of social media servers associated with the plurality of target identifiers. Further, the processing device may be configured for processing the plurality of digital content based on a plurality of platform characteristics corresponding to the plurality of social media servers. Further, the processing device may be configured for generating the plurality of transformed digital content based on the processing.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
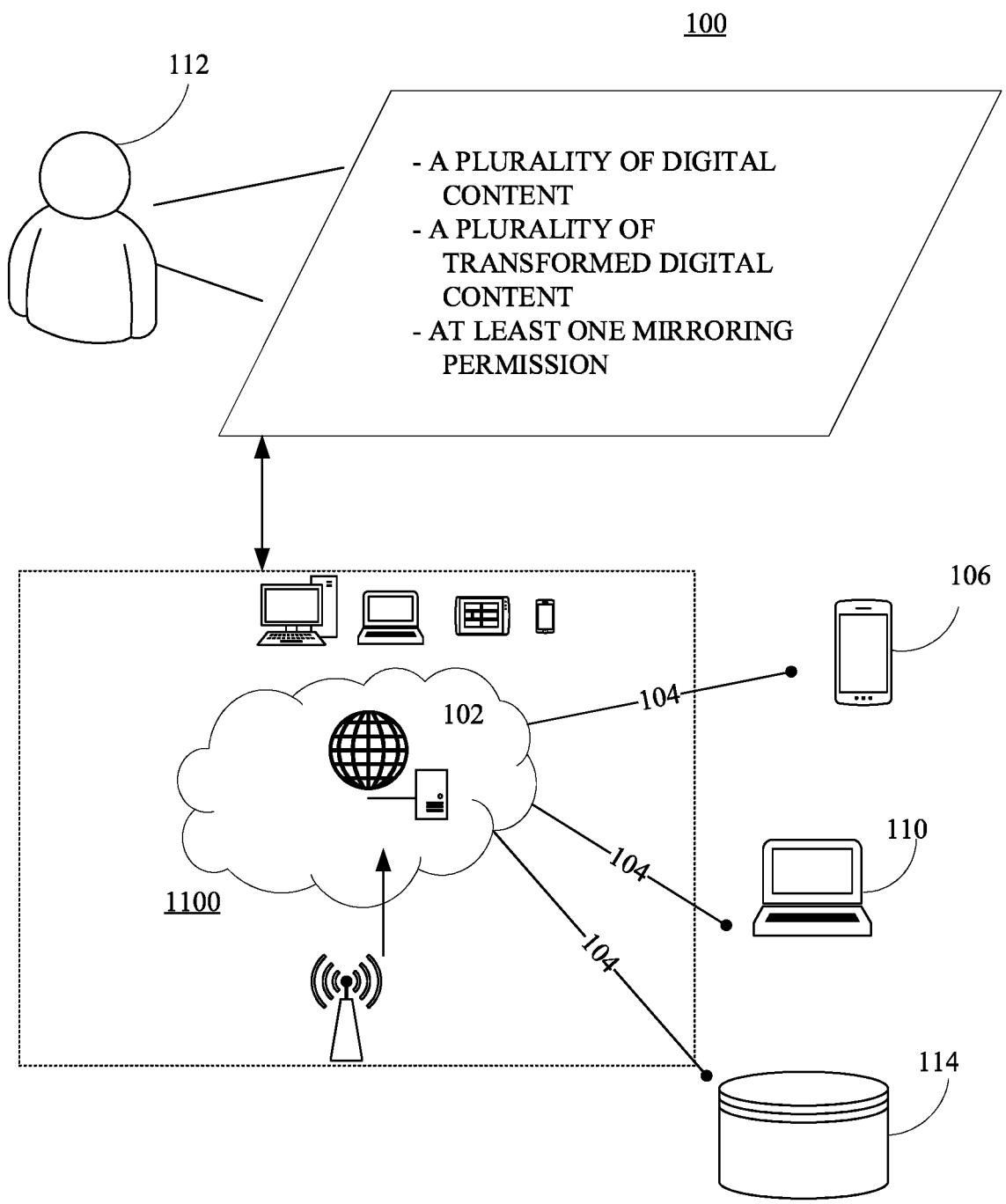
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems and methods for facilitating live streaming of content on multiple social media platforms, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, a GLONASS-K2 receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions.

For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

By providing an alternative process to intracommunity communication. The technology disclosed entails the process of accessing multiple cameras on a device enabling delivery and transposing of live stream (real-time) broadcast of an online social environment, improving existing functionality, and providing new functionality. Access Controlled Protocol and Application Programming Interface (API) enabling multiple cameras for viewing, recording while live streaming. Allowing the device to live stream (real-time) and flow to its intended path to be displayed and viewed in sections on the device's screen.

The technology disclosed relates to utilizing the devices such as but not limited to (cellphone, laptop, tablet, and desktop multiple cameras enabling the user to simultaneously view the front, back, top, bottom, and side cameras at the same time on a device screen when viewing, recording, video calling and live streaming in a social environment.

User Access controlled protocol and API from Halo Live™ App the method for allowing a device multiple cameras to be accessed simultaneously. Comprising of personal viewing or sending and receiving to a second user or multiple Users allowing recorded video, live video, video calling, and photos when Slick Cams is used utilizing a hardware operating system and processor component image and/or audio to the cell phone tower, Low orbit satellites, wireless network 4G/5G/6G/7G to Server before receiving live stream the speed of communication made instant.

Users can watch and record at the same time utilizing multiple cameras by activating Slick Cams functions allowing a combination of any listed scenarios Record video, video phone call, or live video.

In some implementations, the technology disclosed incorporates a Mirror function that can be accessed by User Livestream (real-time). Further, the Mirror function is specifically used for internet content delivered in real-time as it happens. Permission granted by Initial user can now give users of halo social community permission to mirror initial content delivered in real time.

Once User livestream has started a notification is sent to Users followers. Notifying them that the current users is live streaming. Current User can give permission to viewing Followers to Mirror livestream (real time) from multiple cameras. Now viewing Followers can either accept or deny permission to Mirror. If User Followers accept the initial live stream is displayed in sections on the devices screen. Notification is sent to viewing follower Followers notifying them viewing Follower Is Mirroring the initial Users livestream, this process continues creating an infinite mirroring effect.

The Slick Cam Protocol and API goes beyond communication devices it also has the ability to control front to rear cameras on motorized vehicles when prompt once a motorized vehicle collision prevention sensor is activated.

Referring now to figures, FIG. 1 is an illustration of an online platform 100 consistent with various embodiments of the present disclosure. By way of non-limiting example, the online platform 100 to facilitate live streaming of content on multiple social media platforms may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), and databases 114 over a communication network 104, such as, but not limited to, the Internet. Further, users of the online platform 100 may include relevant parties such as, but not limited to, end-users, users, administrators, service providers, service consumers, and so on. Accordingly, in some instances, electronic devices operated by the one or more relevant parties may be in communication with the platform 100.

A user 112, such as the one or more relevant parties, may access online platform 100 through a web-based software application or browser. The web-based software application may be embodied as, for example, but not be limited to, a website, a web application, a desktop application, and a mobile application compatible with a computing device 1100.

Figure 2:
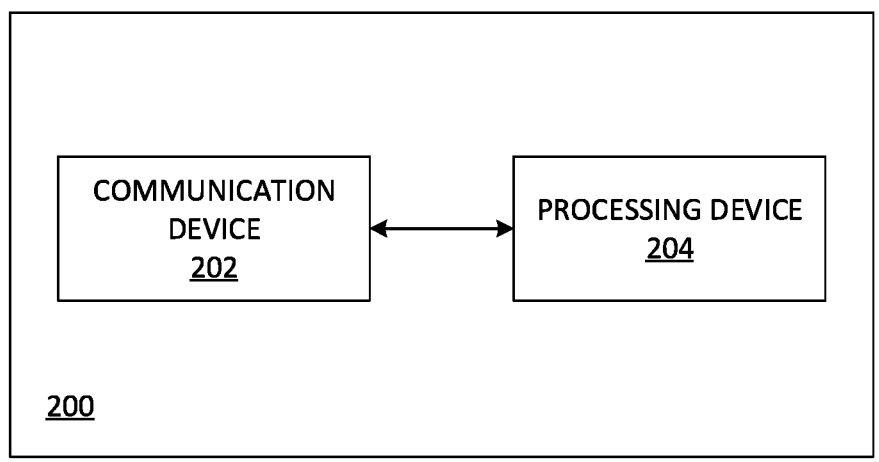
FIG. 2 is a block diagram of a system of facilitating live streaming of content on multiple social media platforms, in accordance with some embodiments.

FIG. 2 is a block diagram of a system 200 of facilitating live streaming of content on multiple social media platforms, in accordance with some embodiments. Accordingly, the system 200 may include a communication device 202 and a processing device 204.

The communication device 202 may be configured for receiving a plurality of digital content from a source user device (such as the mobile device 106, the electronic devices 110, etc.). Further, the source user device may include a plurality of content capturing devices configured for capturing the plurality of digital content. For example, the digital content may include at least one of an audio content, a visual content, an audio-video content, a textual content, and a haptic content and/or ultra-haptic content. Accordingly, in an instance, the ultra-haptic content may simulate a feeling of touch using, for example, acoustic energy. Further, the plurality of content capturing devices may be configured for simultaneously capturing the plurality of digital content from a plurality of content capturing directions.

In some embodiments, the source user device may include a display panel. Further, the display panel may be configured for presenting the plurality of digital content in a plurality of sections of the display panel subsequent to the capturing.

In some embodiments, the plurality of content capturing devices may include a plurality of cameras. Further, the plurality of cameras may include at least two of a front camera, a rear camera, a top camera, a bottom camera, and at least one side camera. Further, the at least two of the front camera, the rear camera, the top camera, the bottom camera, and the at least one side camera may be configured for simultaneously capturing a plurality of images of the plurality of digital content from a plurality of image capturing directions of the plurality of content capturing directions.

In further embodiments, the plurality of cameras may include any two of the front camera, the rear camera, the top camera, the bottom camera, and the at least one side camera. Further, in an embodiment, the plurality of cameras may include the front camera and rear camera. Further, in an embodiment, the plurality of cameras may include the top camera and the bottom camera. Further, in an embodiment, the at least one side camera may include a first side camera associated with a first side of the source user device and a second side camera associated with a second side of the source user device. Further, the plurality of cameras may include the first side camera and the second side camera.

In further embodiments, the plurality of content capturing devices may be detachably couplable with the source user device. Further, the plurality of content capturing devices may include the plurality of cameras. Further, the source user device may include the plurality of cameras detachably couplable to the source user device.

In some embodiments, the plurality of content capturing devices may include a first content capturing device and a second content capturing device. Further, the first content capturing device may be configured for capturing a first digital content and the second content capturing device may be configured for capturing a second digital content simultaneously. Further, the first digital content and the second digital content may be non-homogenous.

Further, the communication device 202 may be configured for receiving a plurality of target identifiers from the source user device. Further, the plurality of target identifiers corresponds to a plurality of target user devices (such as the mobile device 106, the electronic devices 110, etc.).

Further, the communication device 202 may be configured for transmitting a plurality of transformed digital content to a plurality of social media servers (such as the centralized server 102). Accordingly, in some embodiments, the source user device and/or the plurality of target user devices may include the display panel configured for displaying the transformed digital content. Further, in some embodiments, the source user device and/or the plurality of target user devices may include a light projector configured for presenting the transformed digital content. In an instance, the light projector may include a 2D light projector configured for creating a light projection of the transformed digital content over a surface. In another instance, the light projector may include a 3D light projector, such as, a hologram. Additionally, in some embodiments, the plurality of target devices may include an interaction sensing device, such as, but not limited to, at least one of a camera, and a proximity sensor, configured to capture an interaction of a user with at least one of the light projection and the hologram. Further, the source user device and/or the plurality of target user devices may include a haptic device, such as for example, a ultra-haptic device, for presenting haptic feedback corresponding to the interaction. Further, at least one of the display panel and the light projector may be inbuilt in the source user device and/or the plurality of target user devices. Alternatively, in some embodiments, at least one of the display panel and the light projector may be removably attachable to the source user device and/or the plurality of target user devices.

The processing device 204 may be configured for identifying the plurality of social media servers associated with the plurality of target identifiers.

In some embodiments, the plurality of digital content may be transmitted to the plurality of social media servers over at least one network (such as the communication network 104). Further, the at least one network may include at least one of at least one cellular network and at least one satellite network.

Further, the processing device 204 may be configured for processing the plurality of digital content based on a plurality of platform characteristics corresponding to the plurality of social media servers.

Further, the processing device 204 may be configured for generating the plurality of transformed digital content based on the processing.

In some embodiments, the communication device 202 may be configured for receiving at least one mirroring permission from the source user device associated with at least one target user device of the plurality of target user devices. Further, the communication device 202 may be configured for transmitting the at least one of the plurality of digital content and the plurality of transformed digital content to at least one secondary target user device (such as the mobile device 106, the electronic devices 110, etc.) based on the at least one mirroring permission. Further, the processing device 204 may be configured for identifying the at least one secondary target user device associated with the at least one target user device based on at least one target identifier corresponding to the at least one target user device. Further, at least one secondary target user identifier associated with the at least one secondary target user device is socially connected to the at least one target identifier.

In some embodiments, the processing device 204 may be configured for identifying at least one secondary social media server (such as the centralized server 102) associated with the at least one secondary target user identifier. Further, the processing device 204 may be configured for processing the plurality of digital content based on at least one secondary platform characteristic corresponding to the at least one secondary social media server. Further, the processing device 204 may be configured for generating at least one secondary transformed digital content based on the processing of the plurality of digital content based on the at least one secondary platform characteristic. Further, the communication device 202 may be configured for transmitting the at least one secondary transformed digital content to the at least one secondary social media server.

In some embodiments, the communication device 202 may be further configured for receiving at least one sensor data from at least one sensor. Further, the at least one sensor may be configured for generating the at least one sensor data based on at least one movement of at least one object in relation to the source user device. Further, the communication device 202 may be configured for transmitting an activating command to the source user device. Further, the source user device may be configured for activating the plurality of content capturing devices based on the activating command for the capturing of the plurality of digital content. Further, the plurality of content capturing devices does not capture the plurality of digital content prior to the activating. Further, the processing device 204 may be configured for analyzing the at least one sensor data and generating the activating command based on the analyzing. As an example, the source user device may be configured for use in a vehicle of the user. Accordingly, the at least one sensor data may be based on movement of an object such as a pedestrian and/or another vehicle in the vicinity of the vehicle. Accordingly, in an instance, the plurality of content capturing devices (e.g. cameras and/or microphones and/or impact sensors mounted on different locations of the vehicle, such as front, rear and sides of the vehicle) may be activated based on the at least one sensor data indicating the movement of the object. Accordingly, interaction of the vehicle with the object may be digitally captured prior to, during and/or after an incident, such as, but not limited to, a collision of the vehicle with the object.

In some embodiments, the communication device 202 may be further configured for receiving a source indication associated with the plurality of digital content. Further, the communication device 202 may be configured for transmitting a content request to a source server (such as the centralized server 102). Further, the communication device 202 may be configured for receiving the plurality of transformed digital content from the source server. Further, the processing device 204 may be configured for identifying the source server based on the source indication.

In some embodiments, the communication device 202 may be further configured for receiving a supplemental content identifier from the source user device. Further, the processing device 204 may be configured for identifying a supplemental content based on the supplemental content identifier. Further, the supplemental content may include at least one of a background audio content, a visual content, an audio-visual content, a textual content, and a haptic content and/or ultra-haptic content. Accordingly, in an instance, the ultra-haptic content may simulate a feeling of touch using, for example, acoustic energy. Further, the processing device 204 may be configured for embedding the supplemental content in the plurality of transformed digital content.

In further embodiments, the embedding may include adding the supplemental content to the plurality of transformed digital content. Further, the supplemental content may include a visual content. Further, in an instance, the visual content may include at least one watermark. Further, in an instance, the supplemental content may include the textual content. Further, the textual content may include a translation of the plurality of transformed digital content. Further, in an instance, the supplemental content may include the background audio content. Further, the background audio content may include a voiceover of the plurality of transformed digital content.

In further embodiments, the plurality of transformed digital content may include the plurality of digital content from the plurality of content capturing directions. Further, the plurality of transformed digital content may include the plurality of digital content from a plurality of point of views associated with the source user device.

In further embodiments, a plurality of notifications may be transmitted to the plurality of social media servers based on the receiving of the plurality of digital content from the source user device.

Further, in an embodiment, the system 200 facilitates the live streaming of the content on multiple social media platforms using a web-based software application or browser. Further, the web-based software application may include a website, a web application, a desktop application, a mobile application, etc. Further, the system 200 may execute the web-based software application for facilitating the live streaming of the content on multiple social media platforms.

Further, in an embodiment, the source user device, the plurality of target user devices, and the at least one secondary target user device may execute the web-based software application.

Figure 3:
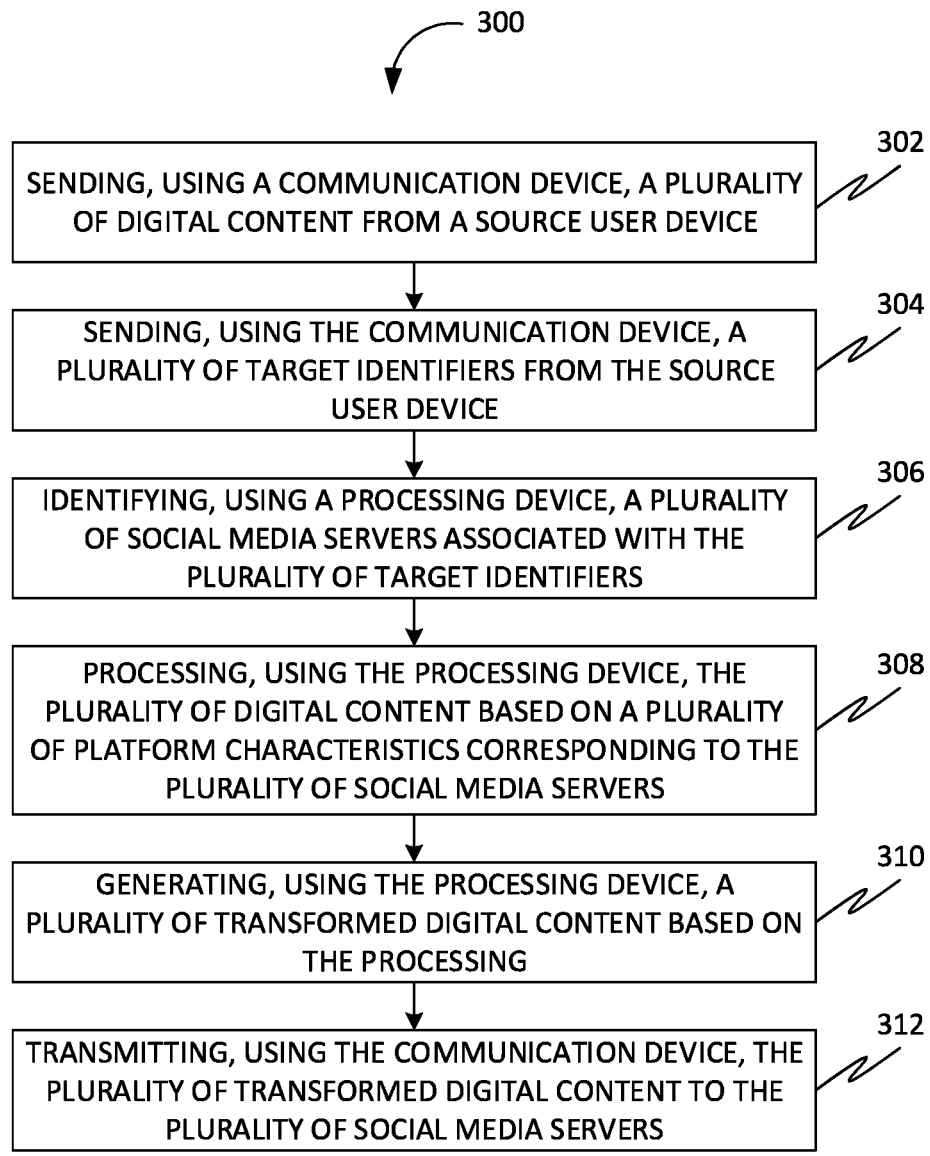
FIG. 3 is a flowchart of a method of facilitating live streaming of content on multiple social media platforms, in accordance with some embodiments.

FIG. 3 is a flowchart of a method 300 of facilitating live streaming of content on multiple social media platforms, in accordance with some embodiments. Accordingly, at 302, the method 300 may include receiving, using a communication device (such as the communication device 202), a plurality of digital content from a source user device (such as the mobile device 106, the electronic devices 110, etc.). Further, the source user device may include a plurality of content capturing devices configured for capturing the plurality of digital content. Further, the plurality of content capturing devices may be configured for simultaneously capturing the plurality of digital content from a plurality of content capturing directions.

In some embodiments, the plurality of content capturing devices may include a plurality of cameras. Further, the plurality of cameras may include at least two of a front camera, a rear camera, a top camera, a bottom camera, and at least one side camera. Further, the at least two of the front camera, the rear camera, the top camera, the bottom camera, and the at least one side camera may be configured for simultaneously capturing a plurality of images of the plurality of digital content from a plurality of image capturing directions of the plurality of content capturing directions.

In further embodiments, the plurality of cameras may include any two of the front camera, the rear camera, the top camera, the bottom camera, and the at least one side camera. Further, in an embodiment, the plurality of cameras may include the front camera and rear camera. Further, in an embodiment, the plurality of cameras may include the top camera and the bottom camera. Further, in an embodiment, the at least one side camera may include a first side camera associated with a first side of the source user device and a second side camera associated with a second side of the source user device. Further, the plurality of cameras may include the first side camera and the second side camera.

In further embodiments, the plurality of content capturing devices may be detachably couplable with the source user device. Further, the plurality of content capturing devices may include the plurality of cameras. Further, the source user device may include the plurality of cameras detachably couplable to the source user device.

In some embodiments, the plurality of content capturing devices may include a first content capturing device and a second content capturing device. Further, the first content capturing device may be configured for capturing a first digital content and the second content capturing device may be configured for capturing a second digital content simultaneously. Further, the first digital content and the second digital content may be non-homogenous.

Further, at 304, the method 300 may include receiving, using the communication device, a plurality of target identifiers from the source user device. Further, the plurality of target identifiers may correspond to a plurality of target user devices (such as the mobile device 106, the electronic devices 110, etc.).

Further, at 306, the method 300 may include identifying, using a processing device (such as the processing device 204), a plurality of social media servers (such as the centralized server 102) associated with the plurality of target identifiers.

Accordingly, in some embodiments, the method may include, receiving a plurality of selections corresponding to the plurality of social media servers. For example, the user may be presented with a collection of social media platform indicators. Accordingly, the user may select a plurality of social media platform indicators corresponding to the plurality of social media platforms. Further, the user may select the first social media platform as a primary social media platform and link one or more secondary social media platforms to the primary social media platform. Accordingly, in this instance, the user may perform live streaming of the digital content using a graphical user interface of the primary social media platform and the digital content may be live streamed to users of both the primary social media platform and the one or more secondary social media platforms.

In further embodiments, a plurality of notifications may be transmitted to the plurality of social media servers based on the receiving of the plurality of digital content from the source user device.

Further, in some embodiments, the method may include, performing a plurality of authentications with the plurality of social media servers in order to facilitate live streaming of the digital content. Accordingly, the method may include transmitting, using the communication device, a plurality of credentials of the user to the plurality of social media servers. In an instance, the plurality of credentials may be centrally stored and managed by one or more of the plurality of social media platforms and/or a multi-platform, multi-streaming service provider (e.g. Halo Live™). Further, the method may include authenticating, using the processing device, the user with the plurality of social media servers based on the plurality of credentials. For instance, when the user selects a social media platform of the plurality of social media platforms, credentials of the user associated with the social media platform may be transmitted to the social media server associated with the social media platform. Accordingly, the social media server may authenticate the user based on the credential and allow access to the social connections of the user and also permit communication with the social connections, including live streaming of the digital content. Additionally, in some embodiments, when the user links the primary social media platform with the one or more secondary social media platforms, the method may include authenticating the user on each of the one or more secondary social media platforms through the primary social media platform. In other words, the user may provide credentials associated with the one or more secondary social media platforms through a graphical user interface of the primary social media platform. Subsequently, based on the credentials the linking of the primary social media platform with the one or more secondary social media platforms may be completed.

Further, at 308, the method 300 may include processing, using the processing device, the plurality of digital content based on a plurality of platform characteristics corresponding to the plurality of social media servers.

Further, at 310, the method 300 may include generating, using the processing device, a plurality of transformed digital content based on the processing.

In further embodiments, the plurality of transformed digital content may include the plurality of digital content from the plurality of content capturing directions. Further, the plurality of transformed digital content may include the plurality of digital content from a plurality of point of views associated with the source user device.

Further, at 312, the method 300 may include transmitting, using the communication device, the plurality of transformed digital content to the plurality of social media servers.

In some embodiments, the plurality of digital content may be transmitted to the plurality of social media servers over at least one network (such as the communication network 104). Further, the at least one network may include at least one of at least one cellular network and at least one satellite network.

In some embodiments, the source user device may include a display panel. Further, the display panel may be configured for presenting the plurality of digital content in a plurality of sections of the display panel subsequent to the capturing.

Further, in an embodiment, the method 300 facilitates the live streaming of the content on multiple social media platforms using a web-based software application or browser. Further, the web-based software application may include a website, a web application, a desktop application, a mobile application, etc. Further, the method 300 may be configured for performing one or more steps of the method 300 using the web-based software application for facilitating the live streaming of the content on multiple social media platforms.

Further, in an embodiment, the source user device and the plurality of target user devices may execute the web-based software application.

Figure 4:
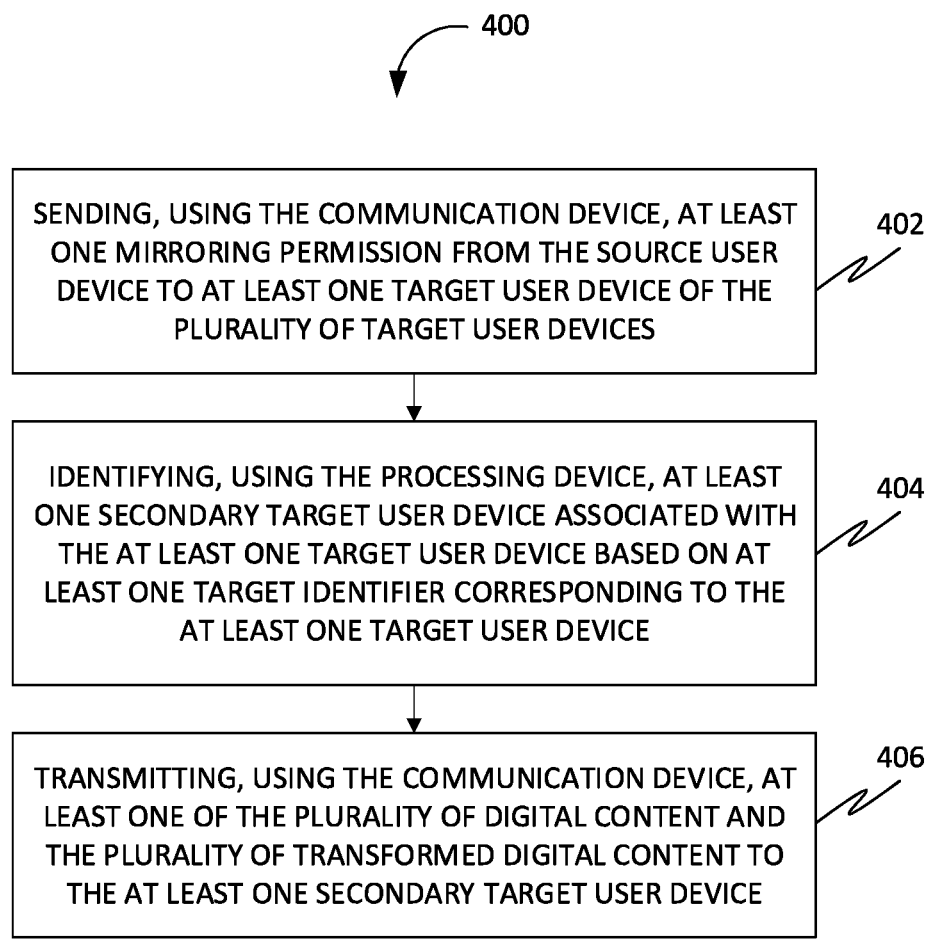
FIG. 4 is a flowchart of a method for transferring the plurality of digital content and the plurality of transformed digital content, in accordance with some embodiments.

FIG. 4 is a flowchart of a method 400 for transferring the plurality of digital content and the plurality of transformed digital content, in accordance with some embodiments. Accordingly, at 402, the method 400 may include receiving, using the communication device (such as the communication device 202), at least one mirroring permission from the source user device associated with at least one target user device of the plurality of target user devices.

Further, at 404, the method 400 may include identifying, using the processing device (such as the processing device 204), at least one secondary target user device (such as the mobile device 106, the electronic devices 110, etc.) associated with the at least one target user device based on at least one target identifier corresponding to the at least one target user device. Further, at least one secondary target user identifier associated with the at least one secondary target user device may be socially connected to the at least one target identifier.

Further, at 406, the method 400 may include transmitting, using the communication device, the at least one of the plurality of digital content and the plurality of transformed digital content to the at least one secondary target user device based on the at least one mirroring permission.

Figure 5:
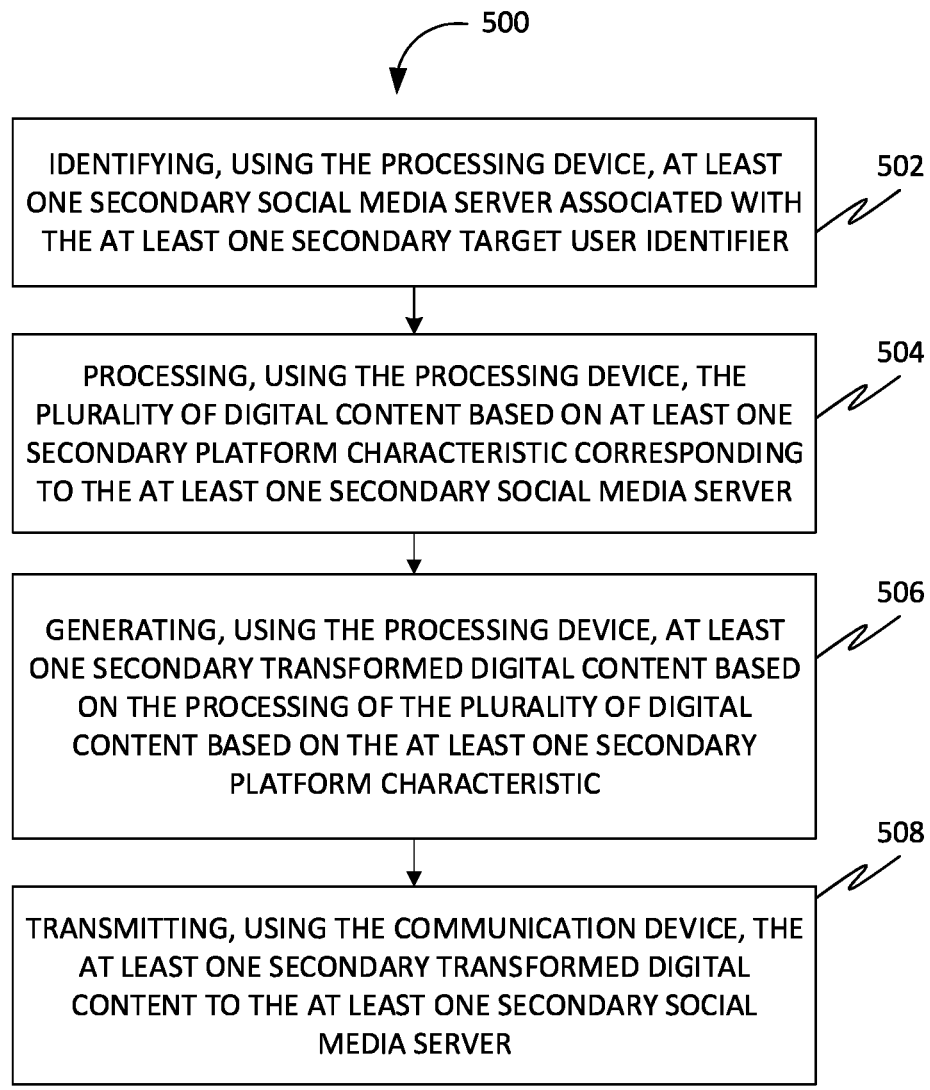
FIG. 5 is a flowchart of a method for transferring a secondary transformed digital content, in accordance with some embodiments.

FIG. 5 is a flowchart of a method 500 for transferring a secondary transformed digital content, in accordance with some embodiments. Accordingly, at 502, the method 500 may include identifying, using the processing device (such as the processing device 204), at least one secondary social media server (such as the centralized server 102) associated with the at least one secondary target user identifier Further, at 504, the method 500 may include processing, using the processing device, the plurality of digital content based on at least one secondary platform characteristic corresponding to the at least one secondary social media server.

Further, at 506, the method 500 may include generating, using the processing device, at least one secondary transformed digital content based on the processing of the plurality of digital content based on the at least one secondary platform characteristic.

Further, at 508, the method 500 may include transmitting, using the communication device (such as the communication device 202), the at least one secondary transformed digital content to the at least one secondary social media server.

Figure 6:
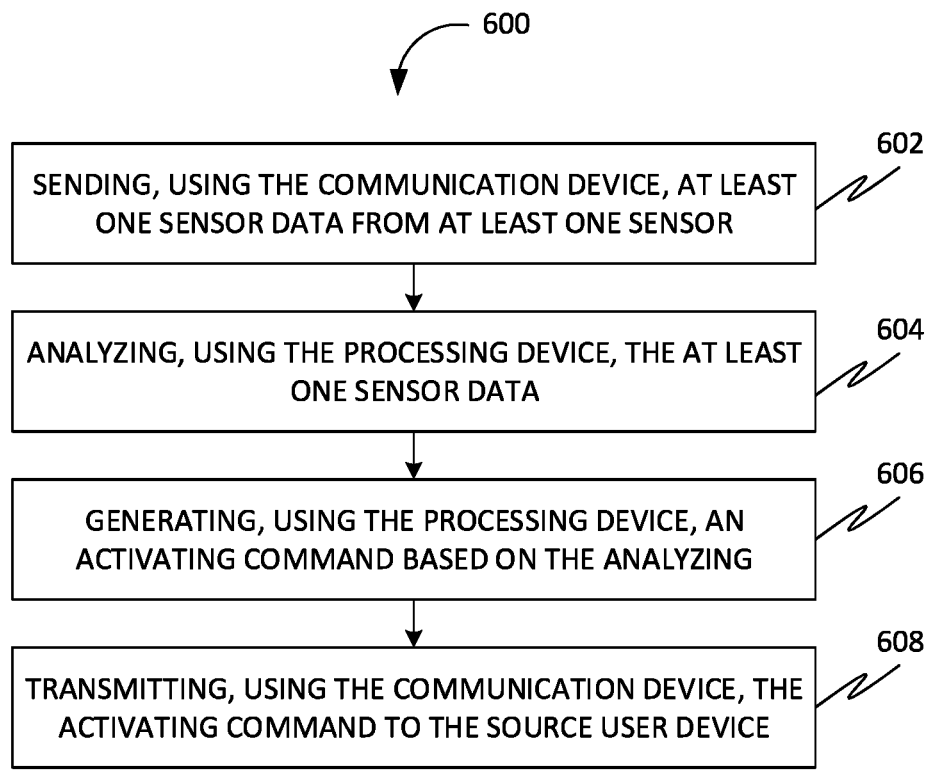
FIG. 6 is a flowchart of a method for transferring an activating command to the source user device, in accordance with some embodiments.

FIG. 6 is a flowchart of a method 600 for transferring an activating command to the source user device, in accordance with some embodiments. Accordingly, at 602, the method 600 may include receiving, using the communication device (such as the communication device 202), at least one sensor data from at least one sensor. Further, the at least one sensor may be configured for generating the at least one sensor data based on at least one movement of at least one object in relation to the source user device.

Further, at 604, the method 600 may include analyzing, using the processing device (such as the processing device 204), the at least one sensor data.

Further, at 606, the method 600 may include generating, using the processing device, the activating command based on the analyzing.

Further, at 608, the method 600 may include transmitting, using the communication device, the activating command to the source user device. Further, the source user device may be configured for activating the plurality of content capturing devices based on the activating command for the capturing of the plurality of digital content. Further, the plurality of content capturing devices does not capture the plurality of digital content prior to the activating.

Figure 7:
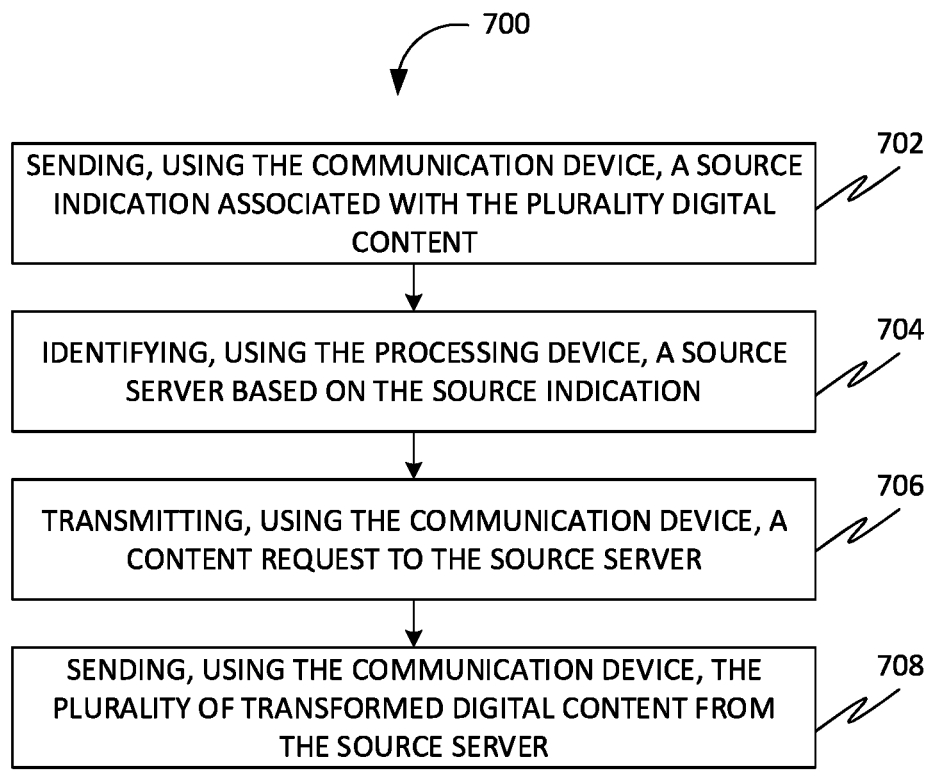
FIG. 7 is a flowchart of a method for transferring the plurality of digital content, in accordance with some embodiments.

FIG. 7 is a flowchart of a method 700 for transferring the plurality of digital content, in accordance with some embodiments. Accordingly, at 702, the method 700 may include receiving, using the communication device (such as the communication device 202), a source indication associated with the plurality of digital content.

Further, at 704, the method 700 may include identifying, using the processing device (such as the processing device 204), a source server (such as the centralized server 102) based on the source indication.

Further, at 706, the method 700 may include transmitting, using the communication device, a content request to the source server.

Further, at 708, the method 700 may include receiving, using the communication device, the plurality of transformed digital content from the source server.

Figure 8:
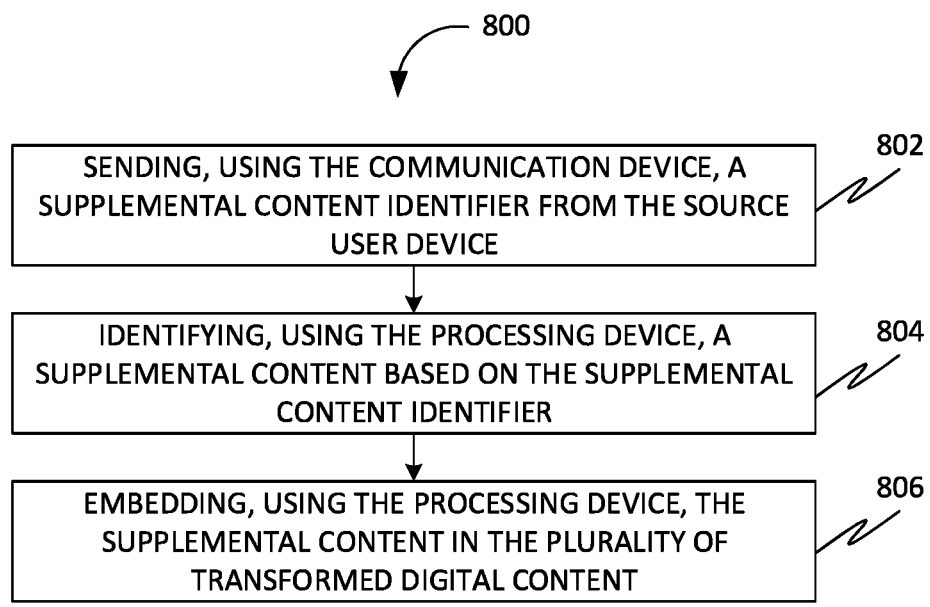
FIG. 8 is a flowchart of a method for including the supplemental content in the plurality of digital content, in accordance with some embodiments.

FIG. 8 is a flowchart of a method 800 for including the supplemental content in the plurality of digital content, in accordance with some embodiments. Accordingly, at 802, the method 800 may include receiving, using the communication device (such as the communication device 202), the supplemental content identifier from the source user device.

Further, at 804, the method 800 may include identifying, using the processing device (such as the processing device 204), a supplemental content based on the supplemental content identifier. Further, the supplemental content may include at least one of a background audio content, a visual content, an audio-visual content, a textual content, and a haptic content.

Further, at 806, the method 800 may include embedding, using the processing device, the supplemental content in the plurality of transformed digital content.

In further embodiments, the embedding may include adding the supplemental content to the plurality of transformed digital content. Further, the supplemental content may include a visual content. Further, in an instance, the visual content may include at least one watermark. Further, in an instance, the supplemental content may include the textual content. Further, the textual content may include a translation of the plurality of transformed digital content. Further, in an instance, the supplemental content may include the background audio content. Further, the background audio content may include a voiceover of the plurality of transformed digital content.

Figure 9:
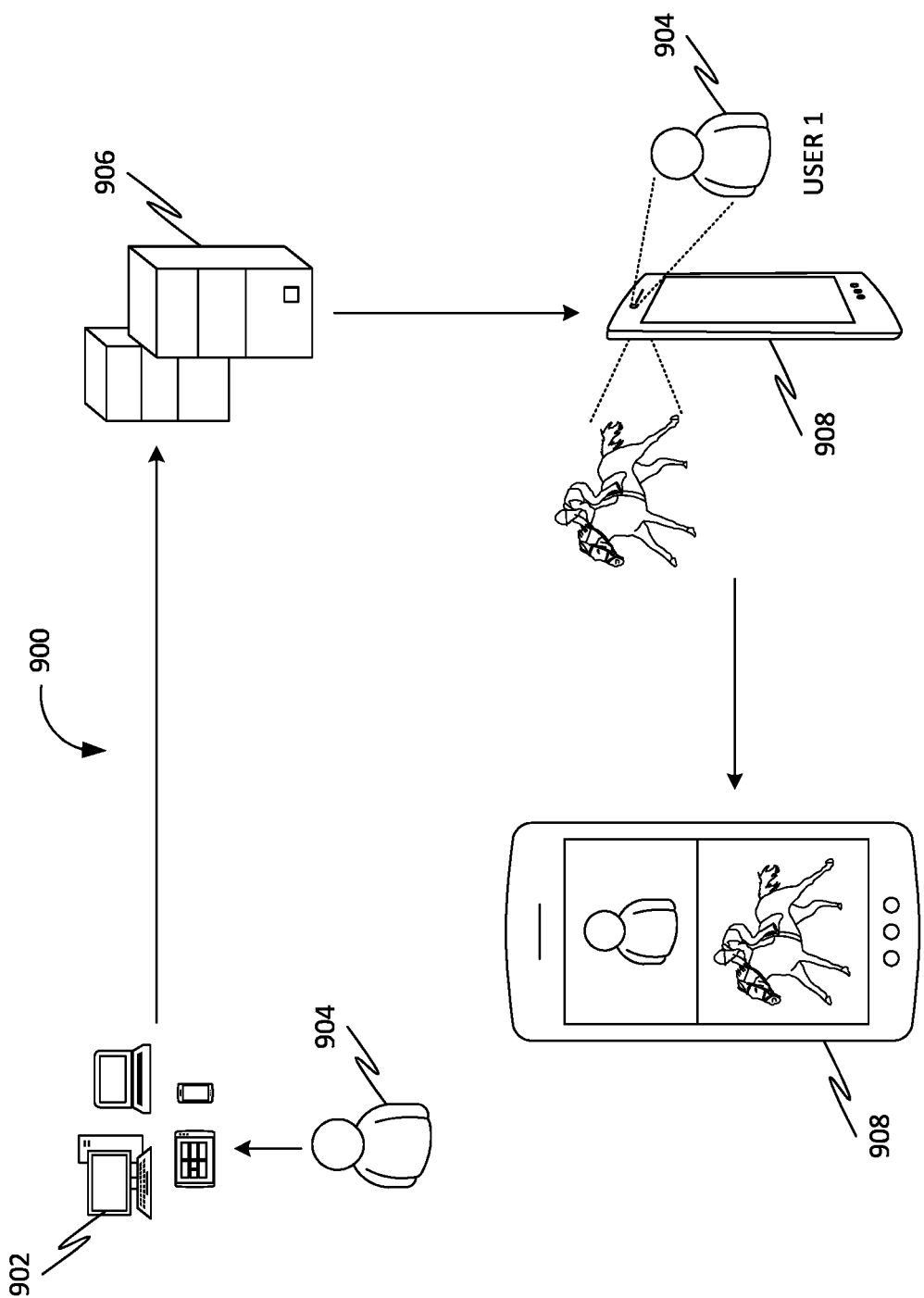
FIG. 9 is a schematic of a system for facilitating accessing of multiple cameras for generating digital content, in accordance with some embodiments.

FIG. 9 is a schematic of a system 900 for facilitating accessing of multiple cameras for generating digital content, in accordance with some embodiments. Further, the system 900 may include at least one user device 902 (such as the mobile device 106, the electronic devices 110, etc.), a Halo Live™ Server 906 (such as the centralized server 102), and a device 908 (such as the mobile device 106, the electronic devices 110, etc.). Further, a user 904 (such as the user 112) may login for connecting to Halo Live™ Stream App and Go Live using the at least one user device 902. Further, the connecting to the Halo Live™ stream App may allow user 904 for sending live audio signal and live video signal to the Halo Live™ Server 906. Further, the Halo Live™ Server 906 may include protocols and APIs. Further, the Halo Live™ Server 906 may enable user 904 to access a front camera and a back camera of the device 908. Further, a Slick protocol and an API Activates Slick Cam enabling the user 904 to access the front and back camera of the device 908. Further, Halo Live™ Slick Cam enables dual cameras activation in devices including Application Programing Interface (API) and Protocol Slick Cam. Further, the Application Programing Interface (API) and the Protocol Slick Cam may be configured for invoking both cameras on the device 908 at the same time when user 904 is live streaming or recording a video or taking a picture. Further, the digital content may be comprised of at least one of the video and the picture. Further, a front camera view and a back camera view are displayed on the user device 908.

Figure 10:
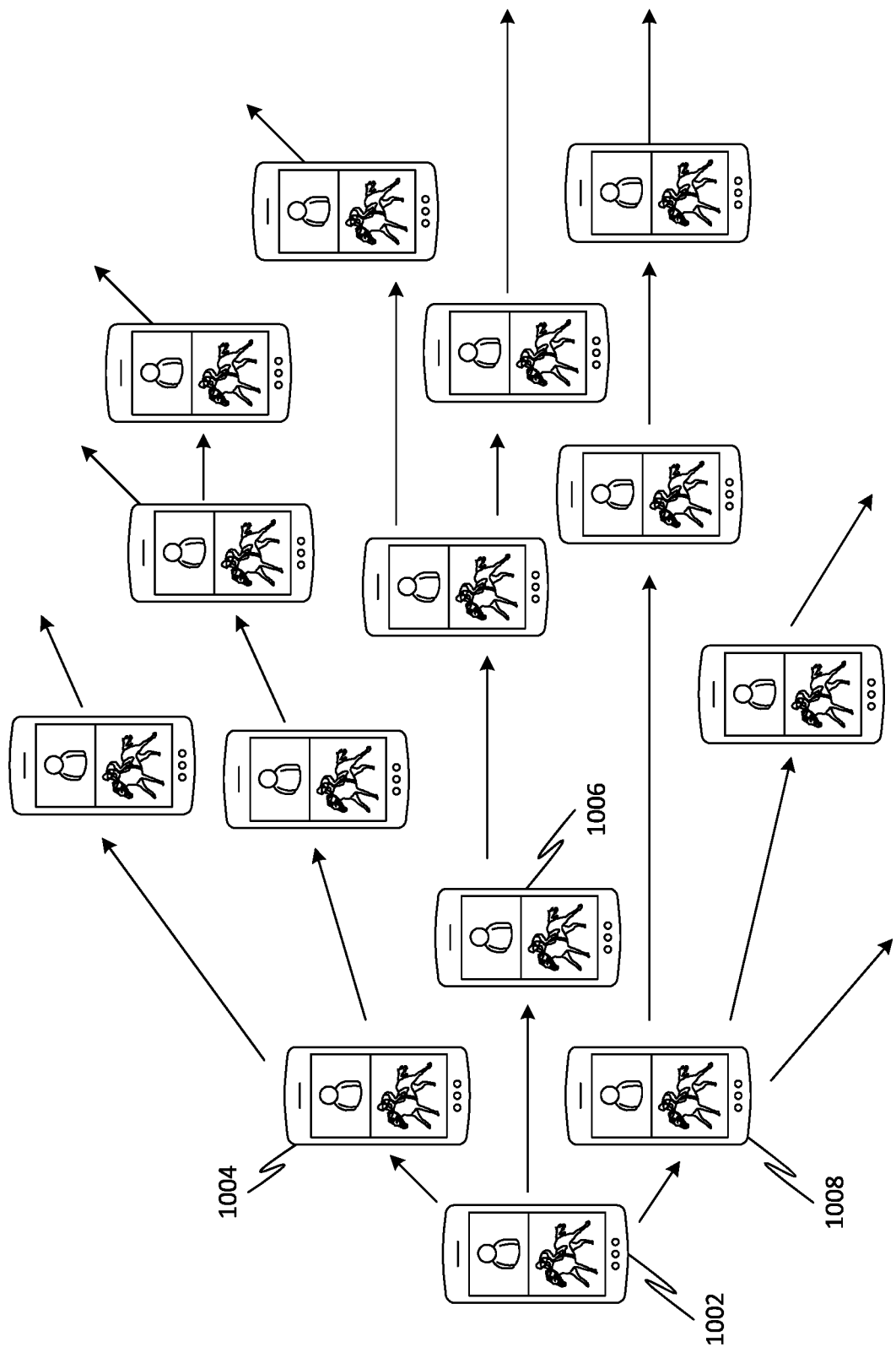
FIG. 10 is an illustration of a slick cam mirror effect, in accordance with some embodiments.

FIG. 10 is an illustration of a slick cam mirror effect, in accordance with some embodiments. Further, a digital content associated with a device 1002 (such as the mobile device 106, the electronic devices 110, etc.) may be transmitted to at least one follower device 1004-1008 (such as the mobile device 106, the electronic devices 110, etc.) associated with the device 1002 in the slick cam mirror effect. Further, the at least one follower device 1004-1008 may be socially connected to the device 1002. Further, the at least one follower device 1004-1008 may mirror the digital content of the device 1002.

According to some embodiments, a device for facilitating live streaming of content on multiple social media platforms is disclosed. Further, the device may include a plurality of content capturing devices, a communication device, and a processing device.

Further, the plurality of content capturing devices may be configured for capturing the plurality of digital content. Further, the plurality of content capturing devices may be configured for simultaneously capturing the plurality of digital content from a plurality of content capturing directions.

Further, the communication device may be configured for transmitting a plurality of transformed digital content to a plurality of social media servers.

Further, the processing device may be communicatively coupled with the plurality of content capturing devices and the communication device. Further, the processing device may be configured for identifying the plurality of social media servers associated with a plurality of target identifiers. Further, the plurality of target identifiers corresponds to a plurality of target user devices. Further, the processing device may be configured for processing the plurality of digital content based on a plurality of platform characteristics corresponding to the plurality of social media servers.

Further, the processing device may be configured for generating the plurality of transformed digital content based on the processing.

Further, in some embodiments, the communication device may be configured for transmitting at least one mirroring permission to at least one target user device of the plurality of target user devices. Further, the transmitting of the at least one of the plurality of digital content and the plurality of transformed digital content from the at least one target user device to at least one secondary target user device may be based on the at least one mirroring permission. Further, the at least one target user device may be configured for identifying the at least one secondary target user device associated with the at least one target user device based on at least one target identifier corresponding to the at least one target user device. Further, at least one secondary target user identifier associated with the at least one secondary target user device may be socially connected to the at least one target identifier. Further, in an embodiment, the processing device may be configured for identifying at least one secondary social media server associated with the at least one secondary target user identifier. Further, the processing device may be configured for processing the plurality of digital content based on at least one secondary platform characteristic corresponding to the at least one secondary social media server. Further, the processing device may be configured for generating at least one secondary transformed digital content based on the processing of the plurality of digital content based on the at least one secondary platform characteristic. Further, the communication device may be configured for transmitting the at least one secondary transformed digital content to the at least one secondary social media server.

In further embodiments, at least one sensor configured for generating at least one sensor data based on at least one movement of at least one object in relation to the device. Further, the processing device may be configured for analyzing the at least one sensor data. Further, the processing device may be configured for generating the activating command based on the analyzing. Further, the device may be configured for activating the plurality of content capturing devices based on the activating command for the capturing of the plurality of digital content. Further, the plurality of content capturing devices does not capture the plurality of digital content prior to the activating.

Further, in some embodiments, the plurality of content capturing devices may include a plurality of cameras. Further, the plurality of cameras may include at least two of a front camera, a rear camera, a top camera, a bottom camera, and at least one side camera. Further, the at least two of the front camera, the rear camera, the top camera, the bottom camera, and the at least one side camera may be configured for simultaneously capturing a plurality of images of the plurality of digital content from a plurality of image capturing directions of the plurality of content capturing directions.

Further, in some embodiments, the plurality of content capturing devices may include a first content capturing device and a second content capturing device. Further, the first content capturing device may be configured for capturing a first digital content and the second content capturing device may be configured for capturing a second digital content simultaneously. Further, the first digital content and the second digital content are non-homogenous.

Further, in some embodiments, the plurality of digital content may be transmitted to the plurality of social media servers over at least one network. Further, the at least one network may include at least one of at least one cellular network and at least one satellite network.

Further, in some embodiments, the device may include a display panel. Further, the display panel may be configured for presenting the plurality of digital content in a plurality of sections of the display panel subsequent to the capturing.

Further, in some embodiments, the processing device may be configured for identifying a source server based on a source indication associated with the plurality of digital content. Further, the communication device may be configured for transmitting a content request to the source server. Further, the communication device may be configured for receiving the plurality of transformed digital content from the source server.

Further, in some embodiments, the processing device may be configured for identifying a supplemental content based on a supplemental content identifier. Further, the supplemental content may include at least one of a background audio content, a visual content, an audio-visual content, a textual content, and a haptic content. Further, the processing device may be configured for embedding the supplemental content in the plurality of transformed digital content.

Further, in some embodiments, the processing device may be configured for authenticating a user with the plurality of social media servers based on a plurality of credentials of the user.

Further, in some embodiments, the plurality of content capturing devices may be detachably couplable to the device.

In further embodiments, the plurality of cameras may include any two of the front camera, the rear camera, the top camera, the bottom camera, and the at least one side camera. Further, in an embodiment, the plurality of cameras may include the front camera and rear camera. Further, in an embodiment, the plurality of cameras may include the top camera and the bottom camera. Further, in an embodiment, the at least one side camera may include a first side camera associated with a first side of the device and a second side camera associated with a second side of the device. Further, the plurality of cameras may include the first side camera and the second side camera.

In further embodiments, the plurality of content capturing devices may include the plurality of cameras. Further, the plurality of cameras detachably couplable to the device.

In further embodiments, the plurality of transformed digital content may include the plurality of digital content from the plurality of content capturing directions. Further, the plurality of transformed digital content may include the plurality of digital content from a plurality of point of views associated with the device.

In further embodiments, a plurality of notifications may be transmitted to the plurality of social media servers based on the receiving of the plurality of digital content from the device.

In further embodiments, the embedding may include adding the supplemental content to the plurality of transformed digital content. Further, the supplemental content may include a visual content. Further, in an instance, the visual content may include at least one watermark. Further, in an instance, the supplemental content may include the textual content. Further, the textual content may include a translation of the plurality of transformed digital content. Further, in an instance, the supplemental content may include the background audio content. Further, the background audio content may include a voiceover of the plurality of transformed digital content.

Further, in an embodiment, the device facilitates the live streaming of the content on multiple social media platforms using a web-based software application or browser. Further, the web-based software application may include a website, a web application, a desktop application, a mobile application, etc. Further, the device may execute the web-based software application for facilitating the live streaming of the content on multiple social media platforms.

Further, in an embodiment, the source user device, the plurality of target user devices, and the at least one secondary target user device may execute the web-based software application.

According to some embodiments, a method of facilitating live streaming of content on multiple social media platforms is disclosed. Further, the method may include a step of receiving, using a communication device, a digital content from a source user device. Further, the source user device may include a content capturing device configured for capturing the digital content. Further, the method may include a step of receiving, using the communication device, a plurality of target identifiers from the source device. Further, the plurality of target identifiers may correspond to a plurality of target user devices. Further, the method may include a step of identifying, using a processing device, a plurality of social media servers associated with the plurality of target identifiers. Further, the method may include a step of processing, using the processing device, the digital content based on a plurality of platform characteristics corresponding to the plurality of social media servers. Further, the method may include a step of generating, using the processing device, a plurality of transformed digital content based on the processing. Further, the method may include a step of identifying a supplemental content based on a supplemental content identifier. Further, the supplemental content may inlcude at least one of a background audio content, a visual content, an audio-visual content, a textual content, and a haptic content. Further, the method may include a step of embedding the supplemental content in the plurality of transformed digital content. Further, the method may include a step of transmitting, using the communication device, the plurality of transformed digital content to the plurality of social media servers.

Figure 11:
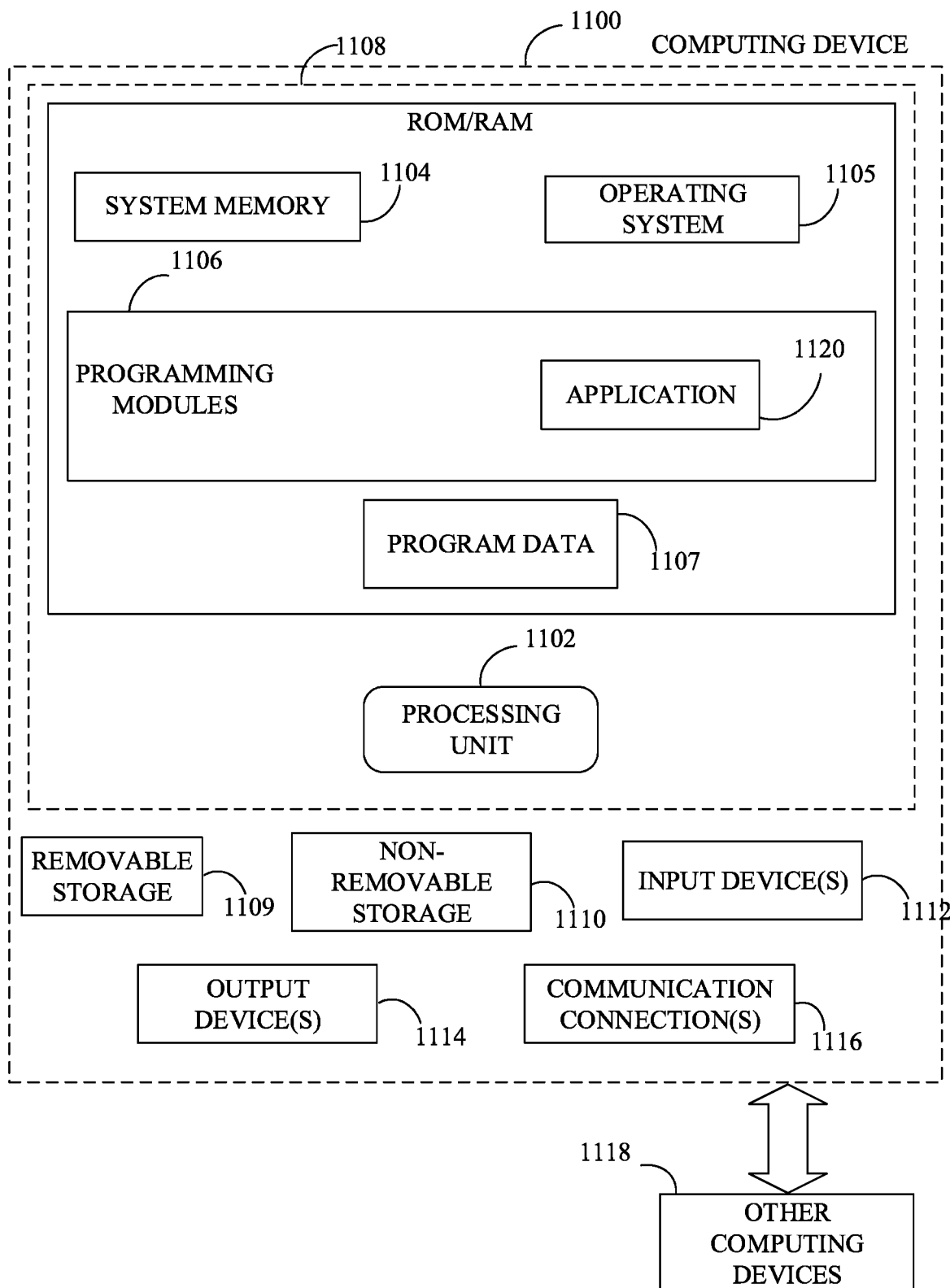
FIG. 11 is a block diagram of a computing device for implementing the methods disclosed herein, in accordance with some embodiments.

With reference to FIG. 11, a system consistent with an embodiment of the disclosure may include a computing device or cloud service, such as computing device 1100. In a basic configuration, computing device 1100 may include at least one processing unit 1102 and a system memory 1104. Depending on the configuration and type of computing device, system memory 1104 may comprise, but is not limited to, volatile (e.g. random-access memory (RAM)), non-volatile (e.g. read-only memory (ROM)), flash memory, or any combination. System memory 1104 may include operating system 1105, one or more programming modules 1106, and may include a program data 1107. Operating system 1105, for example, may be suitable for controlling computing device 1100's operation. In one embodiment, programming modules 1106 may include the image-processing module, machine learning module. Furthermore, embodiments of the disclosure may be practiced in conjunction with a graphics library, other operating systems, or any other application program and is not limited to any particular application or system. This basic configuration is illustrated in FIG. 11 by those components within a dashed line 1108.

Computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and non-volatile, removable and non-removable media implemented in any method or technology for storage of information, such as computer-readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, a location sensor, a camera, a biometric sensor, etc. Output device(s) 1114 such as a display, speakers, a printer, etc. may also be included. The aforementioned devices are examples and others may be used.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1104, including operating system 1105. While executing on processing unit 1102, programming modules 1106 (e.g., application 1120 such as a media player) may perform processes including, for example, one or more stages of methods, algorithms, systems, applications, servers, databases as described above. The aforementioned process is an example, and processing unit 1102 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The invention claimed is:

1. A method of facilitating live streaming of content on multiple social media platforms, the method comprising:
   receiving, using a communication device, a plurality of digital content from a source user device, wherein the source user device comprises a plurality of content capturing devices configured for capturing the plurality of digital content, wherein the plurality of content capturing devices is configured for simultaneously capturing the plurality of digital content from a plurality of content capturing directions;
   receiving, using the communication device, a plurality of target identifiers from the source user device, wherein the plurality of target identifiers corresponds to a plurality of target user devices;
   identifying, using a processing device, a plurality of social media servers associated with the plurality of target identifiers;
   processing, using the processing device, the plurality of digital content based on a plurality of platform characteristics corresponding to the plurality of social media servers;
   generating, using the processing device, a plurality of transformed digital content based on the processing; and
   transmitting, using the communication device, the plurality of transformed digital content to the plurality of social media servers.

2. The method of claim 1 further comprising:
   receiving, using the communication device, at least one mirroring permission from the source user device associated with at least one target user device of the plurality of target user devices;
   identifying, using the processing device, at least one secondary target user device associated with the at least one target user device based on at least one target identifier corresponding to the at least one target user device, wherein at least one secondary target user identifier associated with the at least one secondary target user device is socially connected to the at least one target identifier; and
   transmitting, using the communication device, the at least one of the plurality of digital content and the plurality of transformed digital content to the at least one secondary target user device based on the at least one mirroring permission.

3. The method of claim 2 further comprising:
   identifying, using the processing device, at least one secondary social media server associated with the at least one secondary target user identifier;

processing, using the processing device, the plurality of digital content based on at least one secondary platform characteristic corresponding to the at least one secondary social media server;

generating, using the processing device, at least one secondary transformed digital content based on the processing of the plurality of digital content based on the at least one secondary platform characteristic; and transmitting, using the communication device, the at least one secondary transformed digital content to the at least one secondary social media server.

4. The method of claim 1 further comprising:
receiving, using the communication device, at least one sensor data from at least one sensor, wherein the at least one sensor is configured for generating the at least one sensor data based on at least one movement of at least one object in relation to the source user device;
analyzing, using the processing device, the at least one sensor data;
generating, using the processing device, an activating command based on the analyzing; and
transmitting, using the communication device, the activating command to the source user device, wherein the source user device is configured for activating the plurality of content capturing devices based on the activating command for the capturing of the plurality of digital content, wherein the plurality of content capturing devices does not capture the plurality of digital content prior to the activating.

5. The method of claim 1, wherein the plurality of content capturing devices comprises a plurality of cameras, wherein the plurality of cameras comprises at least two of a front camera, a rear camera, a top camera, a bottom camera, and at least one side camera, wherein the at least two of the front camera, the rear camera, the top camera, the bottom camera, and the at least one side camera are configured for simultaneously capturing a plurality of images of the plurality of digital content from a plurality of image capturing directions of the plurality of content capturing directions.

6. The method of claim 1, wherein the plurality of content capturing devices comprises a first content capturing device and a second content capturing device, wherein the first content capturing device is configured for capturing a first digital content and the second content capturing device is configured for capturing a second digital content simultaneously, wherein the first digital content and the second digital content are non-homogenous.

7. The method of claim 1, wherein the plurality of digital content is transmitted to the plurality of social media servers over at least one network, wherein the at least one network comprises at least one of at least one cellular network and at least one satellite network.

8. The method of claim 1, wherein the source user device comprises a display panel, wherein the display panel is configured for presenting the plurality of digital content in a plurality of sections of the display panel subsequent to the capturing.

9. The method of claim 1 further comprising:
receiving, using the communication device, a source indication associated with the plurality of digital content;
identifying, using the processing device, a source server based on the source indication;
transmitting, using the communication device, a content request to the source server; and
receiving, using the communication device, the plurality of transformed digital content from the source server.

10. The method of claim 1 further comprising:
receiving, using the communication device, a supplemental content identifier from the source user device;
identifying, using the processing device, a supplemental content based on the supplemental content identifier, wherein the supplemental content comprises at least one of a background audio content, a visual content, an audio-visual content, a textual content, and a haptic content; and
embedding, using the processing device, the supplemental content in the plurality of transformed digital content.

11. The method of claim 1 further comprising:
transmitting, using the communication device, a plurality of credentials of the user to the plurality of social media servers; and
authenticating, using the processing device, the user with the plurality of social media servers based on the plurality of credentials.

12. A system of facilitating live streaming of content on multiple social media platforms, the system comprising:
a communication device configured for:
receiving a plurality of digital content from a source user device, wherein the source user device comprises a plurality of content capturing devices configured for capturing the plurality of digital content, wherein the plurality of content capturing devices is configured for simultaneously capturing the plurality of digital content from a plurality of content capturing directions;
receiving a plurality of target identifiers from the source user device, wherein the plurality of target identifiers corresponds to a plurality of target user devices; and
transmitting a plurality of transformed digital content to a plurality of social media servers; and
a processing device is configured for:
identifying the plurality of social media servers associated with the plurality of target identifiers;
processing the plurality of digital content based on a plurality of platform characteristics corresponding to the plurality of social media servers; and
generating the plurality of transformed digital content based on the processing.

13. The system of claim 12, wherein the communication device is further configured for:
receiving at least one mirroring permission from the source user device associated with at least one target user device of the plurality of target user devices; and
transmitting the at least one of the plurality of digital content and the plurality of transformed digital content to at least one secondary target user device based on the at least one mirroring permission, wherein the processing device is further configured for identifying the at least one secondary target user device associated with the at least one target user device based on at least one target identifier corresponding to the at least one target user device, wherein at least one secondary target user identifier associated with the at least one secondary target user device is socially connected to the at least one target identifier.

14. The system of claim 13, wherein the processing device is further configured for:
identifying at least one secondary social media server associated with the at least one secondary target user identifier;

processing the plurality of digital content based on at least one secondary platform characteristic corresponding to the at least one secondary social media server; and generating at least one secondary transformed digital content based on the processing of the plurality of digital content based on the at least one secondary platform characteristic, wherein the communication device is further configured for transmitting the at least one secondary transformed digital content to the at least one secondary social media server.

15. The system of claim 12, wherein the communication device further configured for:

receiving at least one sensor data from at least one sensor, wherein the at least one sensor is configured for generating the at least one sensor data based on at least one movement of at least one object in relation to the source user device; and transmitting an activating command to the source user device, wherein the source user device is configured for activating the plurality of content capturing devices based on the activating command for the capturing of the plurality of digital content, wherein the plurality of content capturing devices does not capture the plurality of digital content prior to the activating, wherein the processing device is further configured for:

analyzing the at least one sensor data; and generating the activating command based on the analyzing.

16. The system of claim 12, wherein the plurality of content capturing devices comprises a plurality of cameras, wherein the plurality of cameras comprises at least two of a front camera, a rear camera, a top camera, a bottom camera, and at least one side camera, wherein the at least two of the front camera, the rear camera, the top camera, the bottom camera, and the at least one side camera are configured for simultaneously capturing a plurality of images of the plurality of digital content from a plurality of image capturing directions of the plurality of content capturing directions.

17. The system of claim 12, wherein the plurality of content capturing devices comprises a first content capturing device and a second content capturing device, wherein the first content capturing device is configured for capturing a first digital content and the second content capturing device is configured for capturing a second digital content simultaneously, wherein the first digital content and the second digital content are non-homogenous.

18. The system of claim 12, wherein the plurality of digital content is transmitted to the plurality of social media servers over at least one network, wherein the at least one network comprises at least one of at least one cellular network and at least one satellite network.

19. The system of claim 12, wherein the source user device comprises a display panel, wherein the display panel is configured for presenting the plurality of digital content in a plurality of sections of the display panel subsequent to the capturing.

20. The system of claim 12, wherein the communication device is further configured for:

receiving a source indication associated with the plurality of digital content;

transmitting a content request to a source server; and receiving the plurality of transformed digital content from the source server, wherein the processing device is further configured for identifying the source server based on the source indication.

21. The system of claim 12, wherein the communication device is further configured for receiving a supplemental content identifier from the source user device, wherein the processing device is further configured for:

identifying a supplemental content based on the supplemental content identifier, wherein the supplemental content comprises at least one of a background audio content, a visual content, an audio-visual content, a textual content, and a haptic content; and embedding the supplemental content in the plurality of transformed digital content.

22. The system of claim 12, wherein the communication device is further configured for transmitting a plurality of credentials of the user to the plurality of social media servers, wherein the processing device is configured for authenticating the user with the plurality of social media servers based on the plurality of credentials.

23. A device for facilitating live streaming of content on multiple social media platforms, the device comprising:

a plurality of content capturing devices configured for capturing the plurality of digital content, wherein the plurality of content capturing devices is configured for simultaneously capturing the plurality of digital content from a plurality of content capturing directions;

a communication device configured for transmitting a plurality of transformed digital content to a plurality of social media servers; and a processing device communicatively coupled with the plurality of content capturing devices and the communication device, wherein the processing device is configured for:

identifying the plurality of social media servers associated with a plurality of target identifiers, wherein the plurality of target identifiers corresponds to a plurality of target user devices;

processing the plurality of digital content based on a plurality of platform characteristics corresponding to the plurality of social media servers; and generating the plurality of transformed digital content based on the processing.

24. The device of claim 23, wherein the communication device is further configured for transmitting at least one mirroring permission to at least one target user device of the plurality of target user devices, wherein transmitting of the at least one of the plurality of digital content and the plurality of transformed digital content from the at least one target user device to at least one secondary target user device is based on the at least one mirroring permission, wherein the at least one target user device is configured for identifying the at least one secondary target user device associated with the at least one target user device based on at least one target identifier corresponding to the at least one target user device, wherein at least one secondary target user identifier associated with the at least one secondary target user device is socially connected to the at least one target identifier.

25. The device of claim 24, wherein the processing device is further configured for:

identifying at least one secondary social media server associated with the at least one secondary target user identifier;

processing the plurality of digital content based on at least one secondary platform characteristic corresponding to the at least one secondary social media server; and generating at least one secondary transformed digital content based on the processing of the plurality of digital content based on the at least one secondary platform characteristic, wherein the communication device is further configured for transmitting the at least one secondary transformed digital content to the at least one secondary social media server.

26. The device of claim 23 further comprising at least one sensor configured for generating at least one sensor data based on at least one movement of at least one object in relation to the device, wherein the processing device is further configured for:
analyzing the at least one sensor data; and
generating the activating command based on the analyzing, wherein the device is configured for activating the plurality of content capturing devices based on the activating command for the capturing of the plurality of digital content, wherein the plurality of content capturing devices does not capture the plurality of digital content prior to the activating.

27. The device of claim 23, wherein the plurality of content capturing devices comprises a plurality of cameras, wherein the plurality of cameras comprises at least two of a front camera, a rear camera, a top camera, a bottom camera, and at least one side camera, wherein the at least two of the front camera, the rear camera, the top camera, the bottom camera, and the at least one side camera are configured for simultaneously capturing a plurality of images of the plurality of digital content from a plurality of image capturing directions of the plurality of content capturing directions.

28. The device of claim 23, wherein the plurality of content capturing devices comprises a first content capturing device and a second content capturing device, wherein the first content capturing device is configured for capturing a first digital content and the second content capturing device is configured for capturing a second digital content simultaneously, wherein the first digital content and the second digital content are non-homogenous.

29. The device of claim 23, wherein the plurality of digital content is transmitted to the plurality of social media servers over at least one network, wherein the at least one network comprises at least one of at least one cellular network and at least one satellite network.

30. The device of claim 23, wherein the device comprises a display panel, wherein the display panel is configured for presenting the plurality of digital content in a plurality of sections of the display panel subsequent to the capturing.

31. The device of claim 23, wherein the processing device is further configured for identifying a source server based on a source indication associated with the plurality of digital content, wherein the communication device is further configured for:
transmitting a content request to the source server; and
receiving the plurality of transformed digital content from the source server.

32. The device of claim 23, wherein the processing device is further configured for:
identifying a supplemental content based on a supplemental content identifier, wherein the supplemental content comprises at least one of a background audio content, a visual content, an audio-visual content, a textual content, and a haptic content; and
embedding the supplemental content in the plurality of transformed digital content.

33. The device of claim 23, wherein the processing device is configured for authenticating a user with the plurality of social media servers based on a plurality of credentials of the user.

34. The device of claim 23, wherein the plurality of content capturing devices is detachably couplable to the device.

35. A method of facilitating live streaming of content on multiple social media platforms, the method comprising:
receiving, using a communication device, a digital content from a source user device, wherein the source user device comprises a content capturing device configured for capturing the digital content;
receiving, using the communication device, a plurality of target identifiers from the source device, wherein the plurality of target identifiers corresponds to a plurality of target user devices;
identifying, using a processing device, a plurality of social media servers associated with the plurality of target identifiers;
processing, using the processing device, the digital content based on a plurality of platform characteristics corresponding to the plurality of social media servers;
generating, using the processing device, a plurality of transformed digital content based on the processing;
identifying a supplemental content based on a supplemental content identifier, wherein the supplemental content comprises at least one of a background audio content, a visual content, an audio-visual content, a textual content, and a haptic content; and
embedding the supplemental content in the plurality of transformed digital content; and
transmitting, using the communication device, the plurality of transformed digital content to the plurality of social media servers.

\* \* \* \* \*